(12) United States Patent
Chen (10) Patent No.: US 9,993,938 B2
(45) Date of Patent: Jun. 12, 2018

(54) COMBINATION OF WORK TABLE AND FENCE ASSEMBLY AND TABLE CUTTING MACHINE WITH COMBINATION

(71) Applicant: CHERVON (HK) LIMITED, Wanchai (HK)

(72) Inventor: Zhifeng Chen, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 164 days.

(21) Appl. No.: 15/245,931

(22) Filed: Aug. 24, 2016

(65) Prior Publication Data
US 2017/0057112 A1 Mar. 2, 2017

(30) Foreign Application Priority Data
Sep. 2, 2015 (CN) .......................... 2015 1 0556743

(51) Int. Cl.
| | | |
|---|---|---|
| *B27B 27/00* | (2006.01) | |
| *B25H 1/02* | (2006.01) | |
| *B25H 1/10* | (2006.01) | |
| *B27B 27/08* | (2006.01) | |
| *B23D 45/06* | (2006.01) | |
| *B23Q 1/28* | (2006.01) | |

(52) U.S. Cl.
CPC .............. *B27B 27/08* (2013.01); *B23D 45/06* (2013.01); *B23Q 1/28* (2013.01); *B25H 1/02* (2013.01); *B25H 1/10* (2013.01); *B27B 27/00* (2013.01); *Y10T 83/7607* (2015.04)

(58) Field of Classification Search
CPC .......... B23D 45/06; B23D 33/10; B23Q 1/28; B25H 1/02; B25H 1/10; B27B 27/00; B27B 27/08; B27B 27/02; Y10T 83/7593; Y10T 83/7607; Y10T 83/7647
See application file for complete search history.

(56) References Cited

U.S. PATENT DOCUMENTS

| | | | | |
|---|---|---|---|---|
| 4,964,450 A | * | 10/1990 | Hughes ................ | B23D 47/025 |
| | | | | 144/286.5 |
| 5,722,308 A | * | 3/1998 | Ceroll .................... | B23Q 3/007 |
| | | | | 144/253.1 |
| 2011/0197733 A1 | * | 8/2011 | Liu ........................ | B27B 27/02 |
| | | | | 83/444 |

* cited by examiner

*Primary Examiner* — Stephen Choi
(74) *Attorney, Agent, or Firm* — Greenberg Traurig, LLP (57) ABSTRACT

A combination includes a work table defining a working surface for placing a workpiece and a fence assembly including a fence. The fence is rotatably mounted on the work table. The fence includes a first contacting surface which is arranged to provide an abutting surface when the fence is rotated to an abutting position and which is arranged to provide an extending surface when the fence is rotated to an extending position, a second contacting surface which is arranged to provide a supporting surface when the fence is rotated to a supporting position, and a third contacting surface which is arranged to provide an abutting surface when the fence is rotated to the supporting position.

20 Claims, 7 Drawing Sheets

COMBINATION OF WORK TABLE AND FENCE ASSEMBLY AND TABLE CUTTING MACHINE WITH COMBINATION

RELATED APPLICATION INFORMATION

This application claims the benefit under 35 U.S.C. § 119(a) of Chinese Patent Application No. CN 201510556743.1, filed on Sep. 2, 2015, the disclosure of which is incorporated herein by reference in its entirety.

FIELD OF THE DISCLOSURE

The present disclosure relates generally to table cutting machines and, more particularly, to a work table and a fence assembly of the table cutting machine.

BACKGROUND OF THE DISCLOSURE

Generally, table cutting machines include a work table mounted on a base for placing a workpiece to be cut. For example, a table saw includes a base, a work table, a saw blade and a prime mover. The saw blade extends out of the work table so as to cut the workpiece. However, at least large workpieces cannot be supported well by the work table because a part of the workpiece extends beyond the work table and, as such, cutting accuracy is affected.

The statements in this section merely provide background information related to the present disclosure and may not constitute prior art.

SUMMARY

In one aspect of the disclosure, a combination includes a work table defining a working surface for placing a workpiece and a fence assembly including a fence, the fence being rotatably mounted on the work table. The fence includes a first contacting surface which is arranged to provide an abutting surface when the fence is rotated to an abutting position and which is arranged to provide an extending surface when the fence is rotated to an extending position, a second contacting surface which is arranged to provide a supporting surface when the fence is rotated to a supporting position and a third contacting surface which is arranged to provide an abutting surface when the fence is rotated to the supporting position. When the fence is in the abutting position, the first contacting surface is substantially perpendicular to the working surface, when the fence is in the extending position, the first contacting surface is substantially parallel to the working surface, and, when the fence is in the supporting position, the second contacting surface is substantially parallel to the working surface and the third contacting surface is substantially perpendicular to the working surface with the first contacting surface being substantially parallel to the third contacting surface.

In another aspect of the disclosure, a table cutting machine includes a base, a work table mounted on the base, which defines a working surface for placing a workpiece and a fence assembly including a fence rotatably mounted on the work table. The fence includes a first contacting surface which is arranged to provide an abutting surface when the fence is rotated to an abutting position and which is arranged to provide an extending surface when the fence is rotated to an extending position, a second contacting surface which is arranged to provide a supporting surface when the fence is rotated to a supporting position and a third contacting surface which is arranged to provide an abutting surface when the fence is rotated to the supporting position. When the fence is in the abutting position, the first contacting surface is substantially perpendicular to the working surface, when the fence is in the extending position, the first contacting surface is substantially parallel to the working surface, and, when the fence is in the supporting position, the second contacting surface is substantially parallel to the working surface and the third contacting surface is substantially perpendicular to the working surface with the first contacting surface being substantially parallel to the third contacting surface.

Further areas of applicability will become apparent from the description provided herein. It should be understood that the description and specific examples are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the scope of the invention hereinafter claimed, its application, or uses.

The following describes a combination of a work table and a fence assembly and a table cutting machine with the work table and the fence device.

Figure 1:
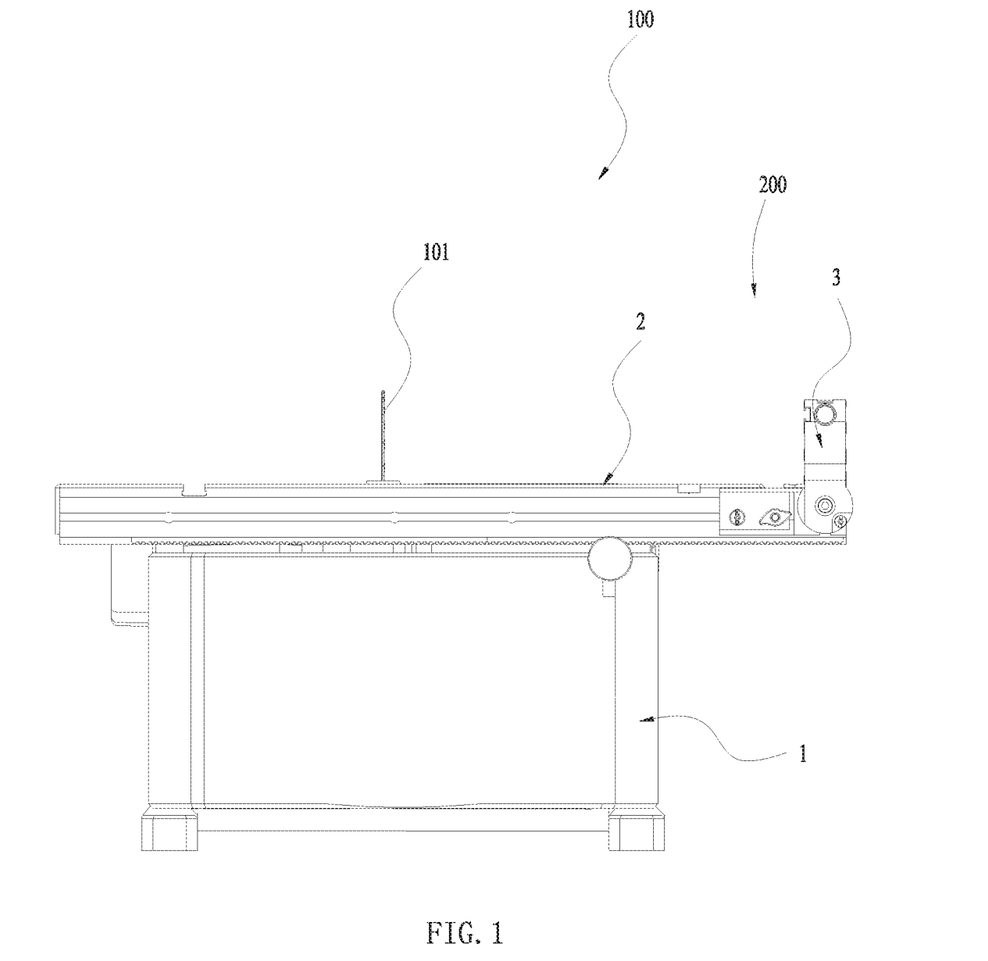
FIG. 1 is a schematic view of an exemplary table cutting machine.

As shown in FIG. 1, the table cutting machine 100 includes a base 1, a work table 2 and a fence assembly 3. The work table 2 and the fence assembly 3 constitute a combination 200. The table cutting machine 100 includes a saw blade 101, which is mounted on the base 1. The saw blade 101 at least partially extends to one side of the work table 2 on which a workpiece (not shown) is placed so as to cut the workpiece. It will be understood, however, that the table cutting machine 100 need not be limited to the illustrated and described table saw. Rather, the principles described hereinafter can be used with other known cutting devices.

As shown in FIG. 1, the base 1 is used to mount the work table 2. The base 1 is formed with a containing space for containing a prime mover, such as a motor. The base 1 includes a bottom portion and a top portion. The bottom portion makes the base 1 stand on the ground steadily, and the top portion forms a supporting structure for supporting the work table 2 steadily.

The work table 2 is mounted on the base 1 so as to place the workpiece to be cut. The work table 2 includes a working surface for placing the workpiece which is on one side of the work table 2 that is departed from the base 1. It is noted that, the working surface is not limited to a whole surface on the side of the work table 2 that is departed from the base 1, which may be a flat surface that is a part of the surface on the side of the work table 2 that is departed from the base 1. For illustrating clearly, a side of the work table 2 that faces the base 1 is defined as 'down', and another side of the work table 2 that faces the workpiece is defined as 'up'.

It is well known that, when the workpiece to be cut is placed on the work table 2, it is needed to set the size of the part of the workpiece to be cut off. Generally, the workpiece has a size which is larger than the maximum size of the work table 2, so that a part of the workpiece that protrudes beyond the work table 2 cannot be supported by the work table 2. Thus, the cutting of the workpiece may be negatively affected, especially for a thin workpiece. In order to solve this problem, a fence assembly 3 is disposed on the same side of the work table 2 as the workpiece. The fence assembly 3 includes at least three situations: a first situation, a second situation and a third situation. In the first situation, the fence assembly 3 is only used to abut the workpiece, and the part to be cut off can be determined through the workpiece being abutted against the fence assembly 3. In the second situation, the fence assembly 3 is only used to extend the working surface, so that the fence assembly 3 can support the workpiece that is larger than the work table 2. In the third situation, the fence assembly 3 can be used to abut the workpiece and support the part of the workpiece which protrudes beyond the work table 2.

Figure 2:
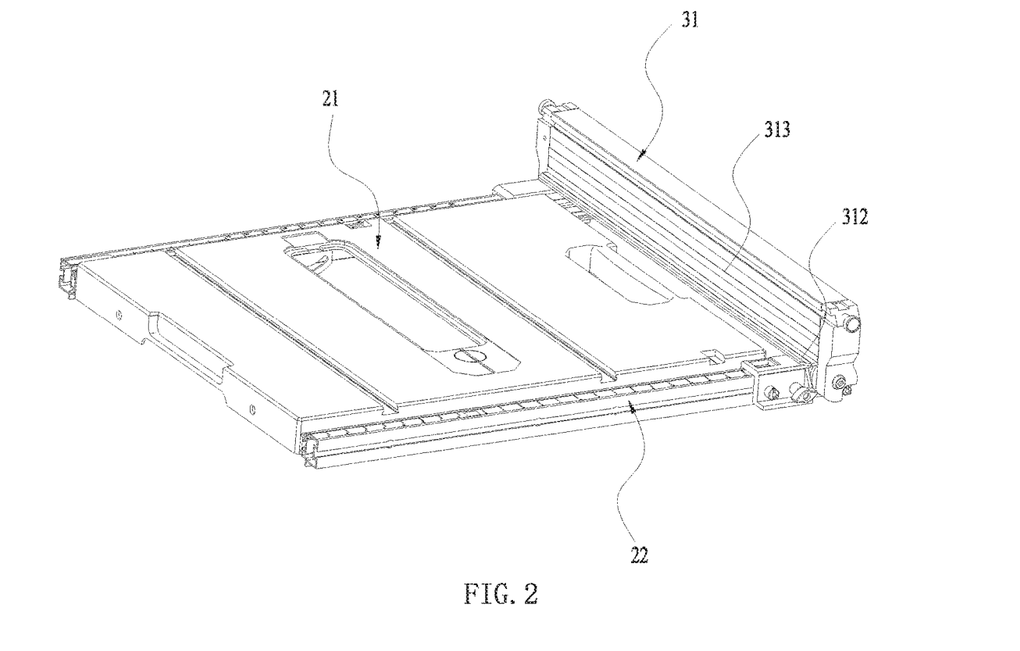
FIG. 2 a schematic view of a work table and a fence assembly of the table cutting machine in FIG. 1.
Figure 3:
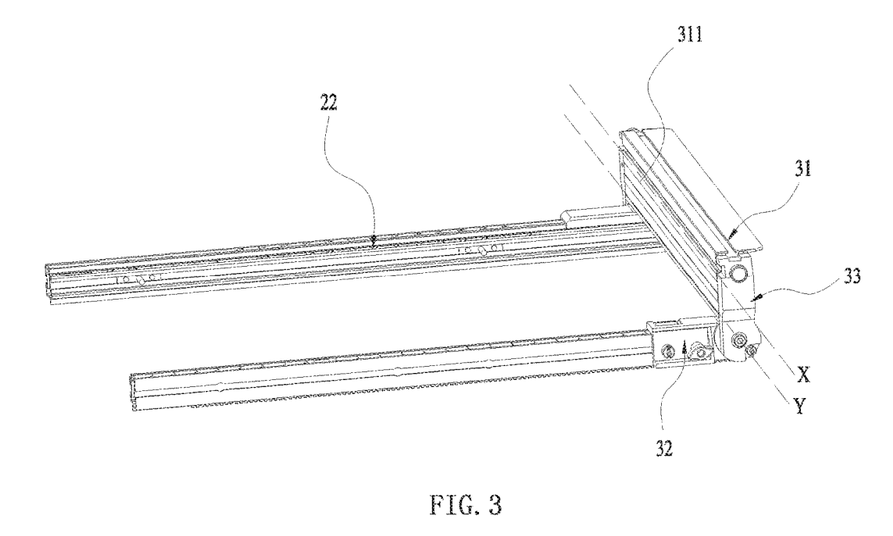
FIG. 3 is a schematic view of a pair of sliding rails and the fence assembly in FIG. 2, wherein the fence is in an abutting position.
Figure 4:
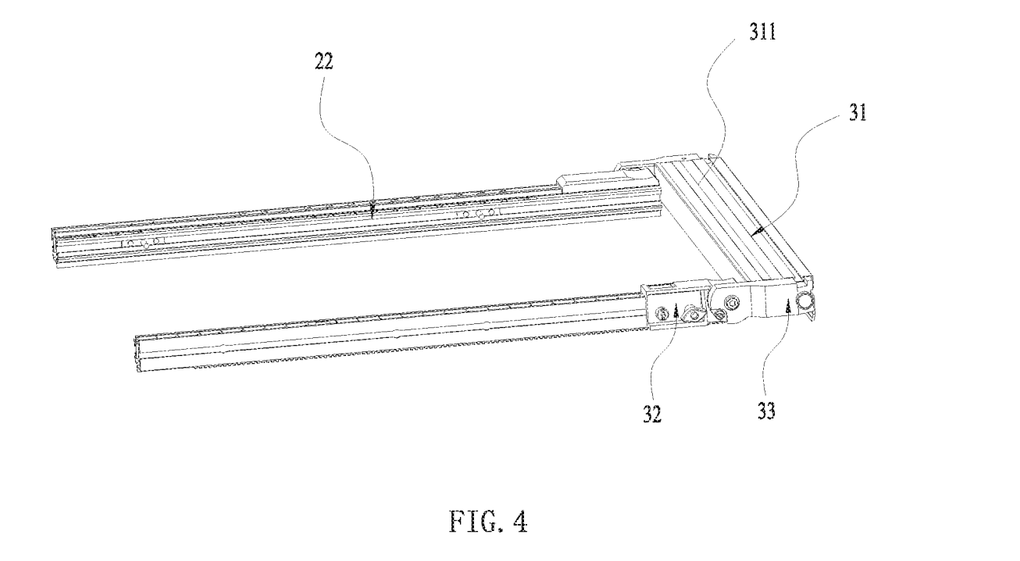
FIG. 4 is a schematic view of the pair of sliding rails and the fence assembly in FIG. 2, wherein the fence is in an extending position.
Figure 5:
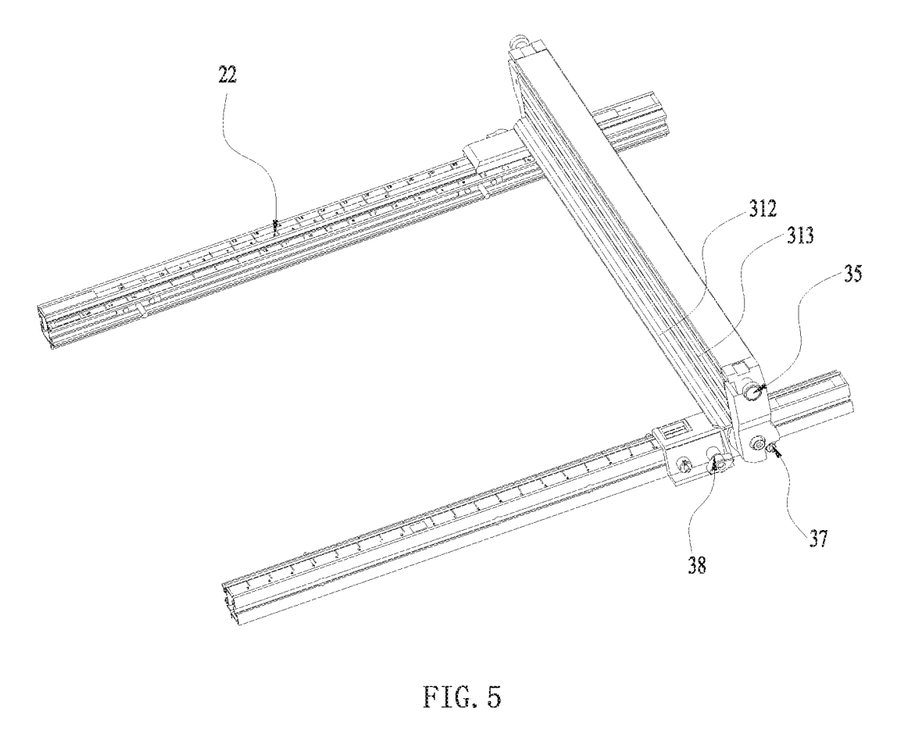
FIG. 5 is a schematic view of the pair of sliding rails and the fence assembly in FIG. 2, wherein the fence is in a supporting position.

Referring to FIGS. 2-3, in order to realize the three situations, the fence assembly 3 includes a fence 31 which is rotatably mounted on the work table 2. The fence 31 includes a first contacting surface 311, a second contacting surface 312 and a third contacting surface 313. The first contacting surface 311 is substantially parallel to the third contacting surface 313. When the fence 31 is rotated to an abutting position as shown in FIG. 3, the first contacting surface 311 is arranged to provide an abutting surface for abutting the workpiece, and the fence assembly 3 is in the first situation. When the fence 31 is rotated to an extending position as shown in FIG. 4, the first contacting surface 311 is arranged to provide an extending surface for placing the workpiece, and the fence assembly 3 is in the second situation. When the fence 31 is rotated to a supporting position as shown in FIG. 5, the second contacting surface 312 is arranged to provide a supporting surface for supporting the workpiece, the third contacting surface 313 is arranged to provide an abutting surface for abutting the workpiece, and the fence assembly 3 is in the third situation. When the fence 31 is in the abutting position, the first contacting surface 311 is substantially perpendicular to the working surface. When the fence 31 is in the extending position, the first contacting surface 311 is substantially parallel to the working surface. When the fence 31 is in the supporting position, the second contacting surface 312 is substantially parallel to the working surface and the third contacting surface 313 is substantially perpendicular to the working surface. Thereby, through rotating the fence 31, the fence assembly 3 is not only capable of determining the size of the part of the workpiece to be cut off, but is also capable of extending the working surface, and further the fence assembly 3 is also capable of adjusting the size of the part of the workpiece to be cut off while supporting the workpiece. So the cutting accuracy is improved. Furthermore, because the first contacting surface 311 is substantially parallel to the third contacting surface 313, the abutting stability and strength of the fence 31 is improved while it is not needed to increase the size of the fence 31 in a direction that is perpendicular to the first contacting surface 311.

Figure 6:
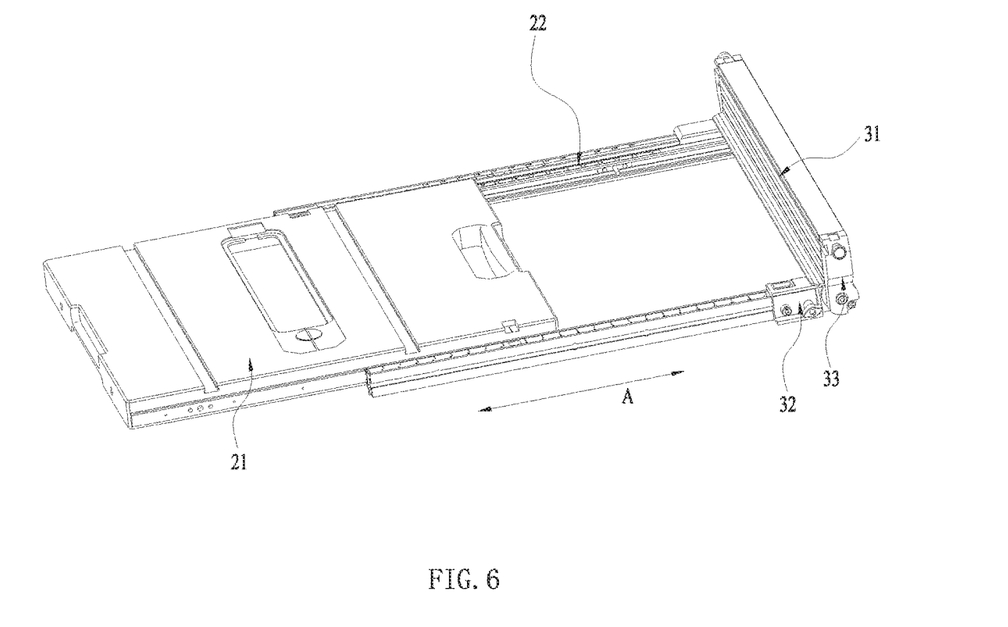
FIG. 6 is a schematic view of the work table and the fence assembly in FIG. 1, wherein the pair of sliding rails slide relative to a work table body.

As shown in FIG. 6, the work table 2 includes a work table body 21 and a pair of sliding rails 22. The work table body 21 has a rectangular shape, which forms the working surface. The two sliding rails 22 are disposed on the opposite sides of the work table body 21 respectively, and the sliding rails 22 are capable of sliding relative to the work table body 21 in a direction that is parallel to the working surface. The sliding directions of the pair of sliding rails 22 are also parallel to the side edges of the work table body 21. The sliding rails 22 are provided with scales which are for a user to observe the sliding distance of the sliding rails 22 relative to the work table body 21.

The fence assembly 3 is at least partially disposed between the pair of sliding rails 22. When the pair of sliding rails 22 slides relative to the work table body 21, the fence assembly 3 is capable of sliding together with the pair of sliding rails 22 relative to the work table body 21 in the direction that is parallel to the working surface. Here, the sliding direction of the pair of sliding rails 22 relative to the work table body 21 is defined as a first direction A. When the fence 31 is in the abutting position, the fence assembly 3 can slide together with the pair of sliding rails 22 relative to the work table body 21 in the first direction A so as to adjust the size of the part of the workpiece to be cut off. When the fence 31 is in the extending position, the fence assembly 3 can slide together with the pair of sliding rails 22 relative to the work table body 21 in the first direction A so as to adjust the size of a whole surface formed by the extending surface and the working surface.

Each sliding rail 22 has two ends which can be used to mount the fence assembly 3. That is, the fence assembly 3 can be mounted on one ends of the sliding rails 22, and also can be detached from the one ends and mounted to another ends of the sliding rails 22. Thus, the table cutting machine 100 applies to more workpieces.

The fence assembly 3 further includes a pair of sliders 32 and a pair of pivoting elements 33. The fence 31 extends in the direction parallel to the working surface and perpendicular to the first direction A of the pair of sliding rails 22. The two sliders 32 are respectively disposed on the two ends of the fence 31 in its extending direction, and the two pivoting elements 33 are also respectively disposed on the two ends of the fence 31 in its extending direction.

As shown in FIG. 5, the two sliders 32 are respectively disposed on the two sliding rails 22, and each slider 32 is capable of sliding relative to the corresponding sliding rail 22 in the direction that is parallel to the working surface. When the pair of sliders 32 slide relative to the pair of sliding rails 22, the pair of pivoting elements 33 and the fence 31 are capable of sliding together with the pair of sliders 32 relative to the pair of sliding rails 22. The sliding direction of the pair of sliders 32 relative to the pair of sliding rails 22 is substantially parallel to the first direction A of the pair of sliding rails 22 sliding relative to the work table body 21. With this arrangement, on the one hand, when the pair of sliding rails 22 slide to a distance relative to the work table 2, the pair of sliders 32 can further slide so as to adjust the position of the fence 31 relative to the work table body 21.

Thus, the size of the part of the workpiece to be cut off can be adjusted and the size of the whole surface formed by the extending surface and the working surface can be adjusted. On the other hand, when the pair of sliding rails 22 does not slide relative to the work table body 21, the pair of sliders 32 can slide so that the fence assembly 3 can slide within the working surface defined by the work table body 21. Thus, the size of the part of the workpiece to be cut off can be reduced. Even for the workpiece that is smaller than the work table 2, the size of the part of the workpiece to be cut off also can be adjusted.

The two pivoting elements 33 are respectively mounted on the two sliders 32, and each pivoting element 33 is capable of pivoting about a second axis Y relative to the corresponding slider 32. When the pair of pivoting elements 33 is rotated, the fence 31 is capable of rotating together with the pair of pivoting elements 33 about the second axis Y.

The fence 31 is disposed between the two pivoting elements 33. The fence 31 is rotatably connected with the pair of pivoting elements 33, which is capable of rotating about a first axis X relative to the pair of pivoting elements 33. The first axis X is substantially parallel to the second axis Y, and the first axis X and the second axis Y are substantially perpendicular to the sliding direction of the sliders 32 relative to the sliding rails 22. When the fence 31 is rotated to the abutting position, a plane that passes through the first axis X and the second axis Y is substantially perpendicular to the working surface. When the fence 31 is rotated to the extending position, the plane that passes through the first axis X and the second axis Y is substantially parallel to the working surface. Because the fence 31 is capable of pivoting about the second axis Y together with the pair of pivoting elements 33 relative to the pair of sliders 32, the pivoting movement of the fence 31 about the second axis Y can be deemed as a revolution movement of the first axis X about the second axis Y.

Figure 7:
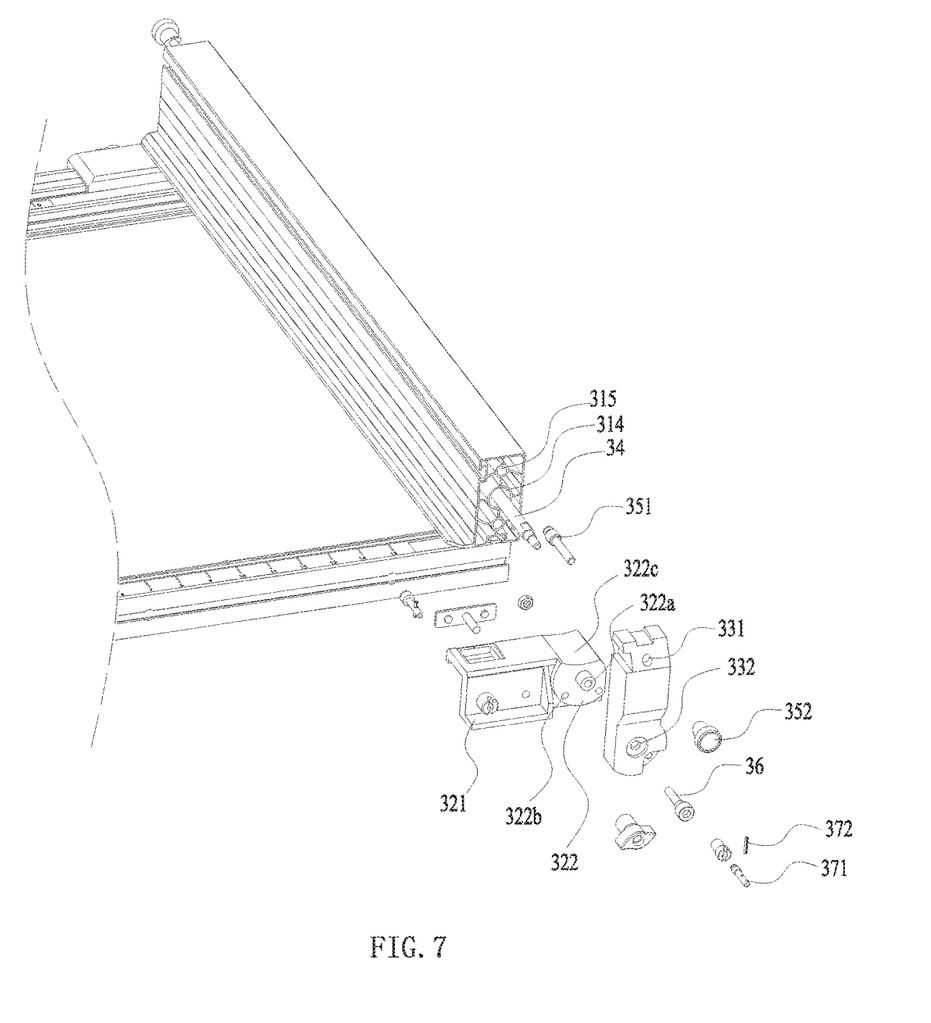
FIG. 7 is a partial exploded view of a part of the pair of sliding rails and the fence assembly in FIG. 2.

As shown in FIG. 7, the fence 31 is approximately a cuboid. The first contacting surface 311 and the third contacting surface 313 are the opposite sides of the cuboid. The second contacting surface 312 is a surface of a protruding portion of the cuboid. The protruding portion is extended in a direction that is substantially perpendicular to the first contacting surface 311 and parallel to the first axis X. The fence 31 has an extending direction (a length direction) which is substantially parallel to the first axis X.

The pivoting elements 33 are located on the two sides of the fence 31 in its extending direction. In order to realize the rotation movement of the fence 31 about the first axis X relative to the pair of pivoting elements 33, the fence assembly 3 further includes a first rotating shaft 34. The fence 31 is formed with a first through hole 314 which allows the first rotating shaft 34 to pass there through. The first rotating shaft 34 has two ends which are extended into and engaged with two first pivoting holes (not shown) of the pivoting elements 33. Thus, the fence 31 is capable of rotating about the first rotating shaft 34, and first rotating shaft 34 forms the first axis X.

The fence assembly 3 further includes a first locating component 35 for locating the position of the fence 31 relative to the pair of pivoting elements 33. The first locating component 35 includes a first locating pin 351 and a first operating element 352. The first locating pin 351 can pass through a second pivoting hole 331 of the pivoting element 33 and extend into a first locating hole 315 of the fence 31. The first operating element 352 is configured to drive the first locating pin 351 to extend into or disengage from the first locating hole 315. When the first operating element 352 is operated by the user so as to disengage the first locating pin 351 from the first locating hole 315, the fence 31 is capable of rotating about the first axis X relative to the pair of pivoting elements 33. When the fence 31 is rotated to make the first locating hole 315 align with the second pivoting hole 331, the first operating element 352 can be operated by the user so as to drive the first locating pin 351 to extend into the first locating hole 315, so the position of the fence 31 relative to the pair of pivoting elements 33 is locked.

Each slider 32 includes a sliding portion 321 and a mounting portion 322. The sliding portion 321 allows the slider 32 to slide relative to the sliding rail 22. The mounting portion 322 is configured to pivotably mount the pivoting element 33. With the action of the first rotating shaft 34 and the first locating component 35, when the pair of pivoting elements 33 is pivoted relative to the pair of sliders 32, the fence 31 is capable of pivoting relative to the pair of sliders 32. In order to realize the pivoting movement of the pair of pivoting elements 33 relative to the pair of sliders 32, the fence assembly 3 further includes a second rotating shaft 36. The second rotating shaft 36 passes through a third pivoting hole 332 of the pivoting element 33 and a fourth pivoting hole 322a of the mounting portion 322 in turn. Thus, the pair of pivoting elements 33 is capable of pivoting about the second rotating shaft 36, and second rotating shaft 36 forms the second axis Y.

The fence assembly 3 further includes a second locating component 37 for locating the position of the pair of pivoting elements 33 relative to the pair of sliders 32. Specifically, the second locating component 37 includes a second locating pin 371 and a biasing spring. The second locating pin 371 passes through the pivoting element 33 and the mounting portion 322 of the slider 32 in turn. The mounting portion 322 is provided with two second locating holes 322b. When the second locating pin 371 is extended into one of the second locating holes 322b, the position of the pair of pivoting elements 33 relative to the slider 32 is locked. The biasing spring is disposed between the pivoting element 33 and the second locating pin 371 so that the second locating pin 371 tends to extend into the second locating hole 322b. When the user wants to pivot the pair of pivoting elements 33, it is only needed to operate the second locating pin 371 to overcome the biasing force of the biasing spring and disengage the pin from the second locating hole 322b, and then the pair of pivoting elements 33 can be pivoted. When the pair of pivoting elements 33 is pivoted to a predetermined position, the second locating pin 371 is released by the user, then the second locating pin 371 extends into the second locating hole 322b, and the position of the pair of pivoting elements 33 relative to the pair of sliders 32 is locked again. The two second locating holes 322b are located on the same side of the third pivoting hole 332. An angle between two lines, which respectively connect one of the second locating holes 322b and the third pivoting hole 332, is approximately 90 degrees so the pair of pivoting element 33 is capable of pivoting relative to the pair of sliders 32 to a position that is substantially parallel to the working surface and another position that is substantially perpendicular to the working surface. The second locating component 37 may further include a plug pin 372. The plug pin 372 is used to lock the second locating pin 371 when the second locating pin 371 is disengaged from the second locating holes 322b.

The fence assembly 3 further includes a third locating component 38 for limiting the position of the pair of sliders 32 relative to the pair of sliding rail 22.

It is noted that, the first locating component 35, the second locating component 37 and the third locating component 38 have a similar locating principle, which may have the same structure or different structures. The structure of the three locating components is not limited to the embodiment described here.

Referring to FIGS. 3-5, the fence 31 is in the abutting position in FIG. 3, which might be regarded as an initial position. At this moment, the first contacting surface 311 is substantially perpendicular to the working surface. The protruding portion which forms the second contacting surface 312 is located on the upside of the work table 2. The fence 31 is only used to abut the workpiece. When the fence 31 is rotated about the first axis X relative to the pair of pivoting elements 33 from the initial position in FIG. 3 to the position in FIG. 5, the fence 31 is in the supporting position. At this moment, the third contacting surface 313 is substantially perpendicular to the working surface. The protruding portion which forms the second contacting surface 312 aligns with the working surface so that the second contacting surface 312 is substantially parallel to the working surface. The fence 31 is not only capable of supporting the workpiece horizontally but also capable of abutting the workpiece vertically. When the fence 31 is pivoted together with the pair of pivoting elements 33 about the second axis Y from the initial position in FIG. 3 to the position in FIG. 4, the fence 31 is in the extending position. At this moment, the first contacting surface 311 is substantially parallel to the working surface. The protruding portion which forms the second contacting surface 312 is on the downside of the working surface. The fence 31 is only used to extend the working surface.

In order to make the fence 31 be able to move out of a range defined by the working surface when the fence 31 is in the abutting position, in the direction that is perpendicular to the working surface, a distance between a surface of the fence 31 which is closest to the working surface and the first axis X is less than a distance between the second contacting surface 312 and the first axis X. The fence 31 is located on the upside of the mounting portion 322. In order to avoid interference between the second contacting surface 312 and the mounting portion 322 when the fence 31 is rotated relative to the pair of pivoting elements 33, the mounting portion 322 is formed with a curved recess 322c on its one side that is near the fence 31. Thus, when the fence 31 is rotated about the first axis X, the second contacting surface 312 on the most outside of the fence 31 cannot contact the mounting portion 322.

The above illustrates and describes basic principles, main features and advantages of the invention hereinafter claimed. Those skilled in the art should appreciate that the above embodiments do not limit the claimed invention in any form. Technical solutions obtained by equivalent substitution or equivalent variations all fall within the scope of the claimed invention.

What is claimed is:

1. A combination, comprising:
a work table defining a working surface for placing a workpiece; and
a fence assembly comprising a fence, the fence being rotatably mounted on the work table, the fence comprising:
a first contacting surface which is arranged to provide an abutting surface when the fence is rotated to an abutting position and which is arranged to provide an extending surface when the fence is rotated to an extending position;
a second contacting surface which is arranged to provide a supporting surface when the fence is rotated to a supporting position; and
a third contacting surface which is arranged to provide an abutting surface when the fence is rotated to the supporting position;
wherein, when the fence is in the abutting position, the first contacting surface is substantially perpendicular to the working surface, when the fence is in the extending position, the first contacting surface is substantially parallel to the working surface, and, when the fence is in the supporting position, the second contacting surface is substantially parallel to the working surface and the third contacting surface is substantially perpendicular to the working surface with the first contacting surface being substantially parallel to the third contacting surface.

2. The combination of claim 1, wherein the fence is rotatable about a first axis, the first axis is pivotable about a second axis, and the second axis is substantially parallel to the first axis.

3. The combination of claim 2, wherein, when the fence is rotated to the abutting position, a plane passing through the first axis and the second axis is substantially perpendicular to the working surface, and, when the fence is rotated to the extending position, the plane passing through the first axis and the second axis is substantially parallel to the working surface.

4. The combination of claim 2, wherein, when the fence is rotated to the abutting position, the second contacting surface is substantially parallel to the working surface and, in a direction that is perpendicular to the working surface, a distance between a surface of the fence which is closest to the working surface and the first axis is less than a distance between the second contacting surface and the first axis.

5. The combination of claim 1, wherein the fence assembly further comprises a pair of pivoting elements which are pivotable about a second axis relative to the working table, and the fence is disposed between the pair of pivoting elements and rotatable about a first axis relative to the pair of pivoting elements.

6. The combination of claim 1, wherein the work table comprises:
a work table body forming the working surface; and
a pair of sliding rails disposed on the opposite sides of the work table body;
wherein the pair of sliding rails are slidable relative to the work table body in a direction that is parallel to the working surface, and the fence assembly is at least partially disposed between the pair of sliding rails and slidable together with the pair of sliding rails relative to the work table body.

7. The combination of claim 6, wherein the fence assembly further comprises:
a pair of sliders which are mounted on the pair of sliding rails, respectively, and slidable relative to the pair of sliding rails in the direction that is parallel to the working surface; and
a pair of pivoting elements which are mounted on the pair of sliders and pivotable about a second axis relative to the pair of sliders;
wherein the fence is mounted between the pair of pivoting elements and rotatably connected with the pair of pivoting elements about a first axis, the first axis is substantially parallel to the second axis, and the first axis is substantially perpendicular to a siding direction of the pair of sliders relative to the pair of sliding rails.

8. The combination of claim 7, wherein the fence assembly further comprises:
- a first locating component arranged for locating the position of the fence relative to the pair of pivoting elements; and
- a second locating component arranged for locating the position of the pair of pivoting elements relative to the pair of sliders.

9. The combination of claim 8, wherein the fence assembly further comprises:
- a first rotating shaft which passes through the fence and which rotatably connects the fence to the pair of pivoting elements about the first axis; and
- a second rotating shaft which pivotally connects the pair of pivoting elements to the pair of sliders about the second axis, respectively.

10. A table cutting machine, comprising:
a base;
a work table mounted on the base, which defines a working surface for placing a workpiece; and
a fence assembly comprising a fence rotatably mounted on the work table, the fence comprising:
a first contacting surface which is arranged to provide an abutting surface when the fence is rotated to an abutting position and which is arranged to provide an extending surface when the fence is rotated to an extending position;
- a second contacting surface which is arranged to provide a supporting surface when the fence is rotated to a supporting position; and
- a third contacting surface which is arranged to provide an abutting surface when the fence is rotated to the supporting position;
wherein, when the fence is in the abutting position, the first contacting surface is substantially perpendicular to the working surface, when the fence is in the extending position, the first contacting surface is substantially parallel to the working surface, and, when the fence is in the supporting position, the second contacting surface is substantially parallel to the working surface and the third contacting surface is substantially perpendicular to the working surface with the first contacting surface being substantially parallel to the third contacting surface.

11. The table cutting machine of claim 10, wherein the fence is rotatable about a first axis, the first axis is pivotable about a second axis, and the second axis is substantially parallel to the first axis.

12. The table cutting machine of claim 11, wherein, when the fence is rotated to the abutting position, a plane passing through the first axis and the second axis is substantially perpendicular to the working surface, and, when the fence is rotated to the extending position, the plane passing through the first axis and the second axis is substantially parallel to the working surface.

13. The table cutting machine of claim 11, wherein, when the fence is rotated to the abutting position, the second contacting surface is substantially parallel to the working surface and, in a direction that is perpendicular to the working surface, a distance between a surface of the fence which is closest to the working surface and the first axis is less than a distance between the second contacting surface and the first axis.

14. The table cutting machine of claim 10, wherein the fence assembly further comprises a pair of pivoting elements which are pivotable about a second axis relative to the working table and the fence is disposed between the pair of pivoting elements and rotatable about a first axis relative to the pair of pivoting elements.

15. The table cutting machine of claim 10, wherein the work table comprises:
- a work table body forming the working surface; and
- a pair of sliding rails disposed on the opposite sides of the work table body;
wherein the pair of sliding rails are slidable relative to the work table body in a direction that is parallel to the working surface, and the fence assembly is at least partially disposed between the pair of sliding rails and slidable together with the pair of sliding rails relative to the work table body.

16. The table cutting machine of claim 15, wherein the fence assembly further comprises:
- a pair of sliders which are mounted on the pair of sliding rails, respectively, and slidable relative to the pair of sliding rails in the direction that is parallel to the working surface; and
- a pair of pivoting elements which are mounted on the pair of sliders and pivotable about a second axis relative to the pair of sliders;
wherein the fence is mounted between the pair of pivoting elements and rotatably connected with the pair of pivoting elements about a first axis, the first axis is substantially parallel to the second axis, and the first axis is substantially perpendicular to a siding direction of the pair of sliders relative to the pair of sliding rails.

17. The table cutting machine of claim 16, wherein the fence assembly further comprises:
- a first locating component arranged for locating the position of the fence relative to the pair of pivoting elements; and
- a second locating component arranged for locating the position of the pair of pivoting elements relative to the pair of sliders.

18. The table cutting machine of claim 17, wherein the fence assembly further comprises:
- a first rotating shaft which passes through the fence and which rotatably connects the fence to the pair of pivoting elements about the first axis; and
- a second rotating shaft which pivotally connects the pivoting elements to the pair of sliders about the second axis, respectively.

19. The table cutting machine of claim 10, wherein the table cutting machine is a table saw.

20. The table cutting machine of claim 19, further comprising a saw blade mounted on the base.

* * * * *